United States Patent
Star et al.

(10) Patent No.: US 9,509,948 B2
(45) Date of Patent: Nov. 29, 2016

(54) VIDEOCONFERENCING

(71) Applicant: MITEL NETWORKS CORPORATION, Ottawa (CA)

(72) Inventors: Robert Star, Kanata (CA); Jainqi Yin, Ottawa (CA); Jeffrey Jay McIntosh, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 93 days.

(21) Appl. No.: 14/215,909

(22) Filed: Mar. 17, 2014

(65) Prior Publication Data

US 2014/0267568 A1    Sep. 18, 2014

(30) Foreign Application Priority Data

Mar. 15, 2013 (GB) .................................. 1304803.8
Jun. 26, 2013 (EP) ..................................... 13173757

(51) Int. Cl.
   *H04N 7/14*      (2006.01)
   *H04N 7/15*      (2006.01)
   *H04L 12/18*     (2006.01)
   *H04L 29/06*     (2006.01)

(52) U.S. Cl.
   CPC ............ *H04N 7/15* (2013.01); *H04L 12/1818* (2013.01); *H04L 65/1069* (2013.01); *H04L 65/403* (2013.01)

(58) Field of Classification Search
   CPC ............. H04L 12/1818; H04L 65/403; H04L 65/1069
   USPC .................... 348/14.01–14.16; 370/259–271, 370/351–357; 379/201.01, 202.01–207.01; 709/201–207, 217–248
   See application file for complete search history.

(56) References Cited

U.S. PATENT DOCUMENTS

| | | | |
|---|---|---|---|
| 6,687,234 B1 * | 2/2004 | Shaffer et al. | 370/260 |
| 7,664,036 B2 * | 2/2010 | Bye | 370/237 |
| 7,764,605 B2 * | 7/2010 | Wu et al. | 370/230 |

(Continued)

FOREIGN PATENT DOCUMENTS

WO    WO 2004/077835 A1    9/2004

OTHER PUBLICATIONS

Haakon Riiser, et at "Video Streaming Using a Location-based Bandwidth-Lookup Service for Bitrate Planning", 2011, 24 pp. ACM, Inc. New, NY.
"Cisco Jabber Video for TelePresence Data Sheet", www.Cisco.co/en/US/prod/collateral/ . . . , Nov. 2, 2013, 6 pp.

*Primary Examiner* — Hemant Patel (57) ABSTRACT

A method performed by a videoconferencing device, the method comprising: maintaining a database (129) comprising multiple records, each record including bit rate information and relating to a particular endpoint identifier; initiating a videoconference call with a target endpoint (101, 103); identifying (S2) one or more records in the database (129) that relate to the endpoint identifier of the target endpoint (101, 103); identifying (S5) one or more records in the database (129) that relate to the endpoint identifier of one or more endpoints located in a common zone with the target endpoint (101, 103); using bit rate information from the identified records to calculate (S4, S7, S8) an initial video bit rate for the videoconference call; and initially transmitting video to the target endpoint (101, 103) at the calculated initial video bit rate. Apparatus configured to implement the foregoing method.

20 Claims, 5 Drawing Sheets

| | Zone information | Bit rate information | | | | |
|---|---|---|---|---|---|---|
| Endpoint identifier (D) | Zone (m) | t1 (Mbit/s) | t2 (Mbit/s) | t3 (Mbit/s) | ..... | t24 (Mbit/s) |
| 0044 1234 562 | Z1 | 2.1 | 2.3 | 0 | ..... | 1.9 |
| 0044 2345 678 | Z2 | 1.5 | 1.3 | 0 | ..... | 1.3 |
| 0044 3456 789 | Z2 | 1.4 | 1.4 | 1.1 | ..... | 1.0 |
| 0044 4567 890 | Z2 | 1.3 | 1.5 | 1.8 | ..... | 0.8 |
| 0044 5678 901 | Z3 | 3.2 | 3.1 | 1.9 | ..... | 2.7 |
| 0044 6789 012 | Z3 | 3.0 | 2.9 | 1.8 | ..... | 2.7 |

129

(56) References Cited

U.S. PATENT DOCUMENTS

| | | | |
|---|---|---|---|
| 7,864,714 B2* | 1/2011 | Tracey | 370/260 |
| 8,009,593 B2* | 8/2011 | Ruetschi et al. | 370/260 |
| 8,031,771 B2* | 10/2011 | Chen et al. | 375/240.1 |
| 2003/0158968 A1 | 8/2003 | Huart et al. | |
| 2004/0109440 A1* | 6/2004 | Mattathil | 370/352 |
| 2006/0245379 A1* | 11/2006 | Abuan et al. | 370/261 |
| 2007/0165644 A1 | 7/2007 | Rossler | |
| 2008/0158337 A1* | 7/2008 | Richardson | 348/14.09 |

* cited by examiner

| Endpoint identifier (D) | Zone information | Bit rate information | | | |
|---|---|---|---|---|---|
| | Zone (m) | t1 (Mbit/s) | t2 (Mbit/s) | t3 (Mbit/s) | ⋯ | t24 (Mbit/s) |
| 0044 1234 562 | Z1 | 2.1 | 2.3 | 0 | ⋯ | 1.9 |
| 0044 2345 678 | Z2 | 1.5 | 1.3 | 0 | ⋯ | 1.3 |
| 0044 3456 789 | Z2 | 1.4 | 1.4 | 1.1 | ⋯ | 1.0 |
| 0044 4567 890 | Z2 | 1.3 | 1.5 | 1.8 | ⋯ | 0.8 |
| 0044 5678 901 | Z3 | 3.2 | 3.1 | 1.9 | ⋯ | 2.7 |
| 0044 6789 012 | Z3 | 3.0 | 2.9 | 1.8 | ⋯ | 2.7 |

VIDEOCONFERENCING

FIELD OF THE INVENTION

The present invention relates to videoconferencing and relates particularly to a method of initiating a videoconferencing session at a particular bit rate and apparatus configured to implement the method.

BACKGROUND TO THE INVENTION

Devices used to participate in video conferences may experience fluctuations in available bandwidth. This could adversely affect the quality of a user's video conference experience by reducing the quality of signals received by a video conference device from other devices participating in the call. For instance, at one moment the channel between the endpoints in the conference may accommodate the transmit bit rate of a first video conference device. Subsequently however the bandwidth of the channel may drop. In this situation the transmit bit rate of the first device may exceed the maximum bit rate of the channel. This would have the result that not all packets transmitted from the first video conference device are received by the second video conference device, thereby reducing the quality of the video conference experience of a user of the second device. Setting low bit rates for communication reduces the chances of lost packets but results in video in a lower quality than could be accommodated by the channel.

Dynamic bandwidth adaptation techniques have been used which reduce the effects of bandwidth fluctuations experienced during video conference calls. Such techniques involve changing the transmit bit rate of one video conference device on-the-fly in accordance with the receive bit rate of another video conference device.

The problem still exists however that the initial transmit bit rate during a video conference call may exceed the initial bit rate that the channel between the endpoints can accommodate, or that it can be significantly lower than the bit rate that the channel can accommodate. Although dynamic bandwidth adaptation techniques may be used to adjust the transmit bit rate to accommodate the maximum receive bit rate, while this is taking place the quality of the video conference experience may be reduced due to packet loss or due to underutilisation of the channel bandwidth. Aspects of the present invention have been conceived with this in mind.

SUMMARY OF THE INVENTION

According to a first aspect of the invention there is provided a method performed by a videoconferencing device, the method comprising:
  maintaining a database comprising multiple records, each record including bit rate information and relating to a particular endpoint identifier;
  initiating a videoconference call with a target endpoint;
  identifying one or more records in the database that relate to the endpoint identifier of the target endpoint;
  identifying one or more records in the database that relate to the endpoint identifier of one or more endpoints located in a common zone with the target endpoint;
  using bit rate information from the identified records to calculate an initial video bit rate for the videoconference call; and
  initially transmitting video to the target endpoint at the calculated initial video bit rate.

The method may further comprise determining as a first value, from each record relating to the endpoint identifier of the target endpoint, a weighted average of the average video bit rate, at which video was transmitted to the target endpoint, during previous videoconferencing sessions therewith.

The method may also further comprise determining, from each record relating to the endpoint identifier of an endpoint located in a common zone with the target endpoint, a weighted average value of:
  the average video bit rate at which video was transmitted to said respective endpoint during previous videoconferencing sessions therewith.

The method may additionally further comprise determining as a second value, an average of:
  the weighted average values, respectively associated with each said endpoint located in a common zone with the target endpoint.

The step of calculating an initial video bit rate for the videoconference call may comprise determining a weighted average of the first and second values.

Each record may relate to a particular combination of a time slot and an endpoint identifier, and identifying one or more records in the database may comprise identifying one or more records that relate both to the appropriate endpoint identifier and to a time slot including a current time.

The method may further comprise, after the videoconference call with the target endpoint has ended, updating the database to include bit rate information associated with the videoconference call.

The method may further comprise determining a weighted average of:
  the average video bit rate at which video was transmitted to the target endpoint during the videoconference call; and
  a weighted average of the average video bit rate at which video was transmitted to the target endpoint during previous videoconferencing sessions therewith, prior to the videoconference call.

The method may further comprise, after the video conference call with the target endpoint has ended, sharing with at least one other videoconferencing device, for instance by broadcasting, information concerning the average video bit rate at which video was transmitted, to the target endpoint, during the videoconference call.

According to a second aspect of the invention there is provided apparatus comprising a videoconferencing device configured to:
  maintain a database comprising multiple records, each record including bit rate information and relating to a particular endpoint identifier;
  initiate a videoconference call with a target endpoint;
  identify one or more records in the database that relate to the endpoint identifier of the target endpoint;
  identify one or more records in the database that relate to the endpoint identifier of one or more endpoints located in a common zone with the target endpoint;
  use bit rate information from the identified records to calculate an initial video bit rate for the videoconference call; and
  initially transmit video to the target endpoint at the calculated initial video bit rate.

The apparatus may be configured to determine as a first value, from each record relating to the endpoint identifier of the target endpoint, a weighted average of the average video bit rate, at which video was transmitted to the target endpoint, during previous videoconferencing sessions therewith.

The apparatus may be configured to determine, from each record relating to the endpoint identifier of an endpoint located in a common zone with the target endpoint, a weighted average value of:

the average video bit rate at which video was transmitted to said respective endpoint during previous videoconferencing sessions therewith.

The apparatus may be configured to determine as a second value, an average of:

the weighted average values, respectively associated with each said endpoint located in a common zone with the target endpoint.

The apparatus may be configured to calculate an initial video bit rate for the videoconference call by determining a weighted average of the first and second values.

Each record may relate to a particular combination of a time slot and an endpoint identifier, and the apparatus may be configured to identify one or more records in the database by identifying one or more records that relate both to the appropriate endpoint identifier and to a time slot including a current time.

BRIEF DESCRIPTION OF THE DRAWINGS

Embodiments will now be described, by way of example only, with reference to the accompanying drawings, in which.

DETAILED DESCRIPTION OF PREFERRED EMBODIMENTS

Figure 1:
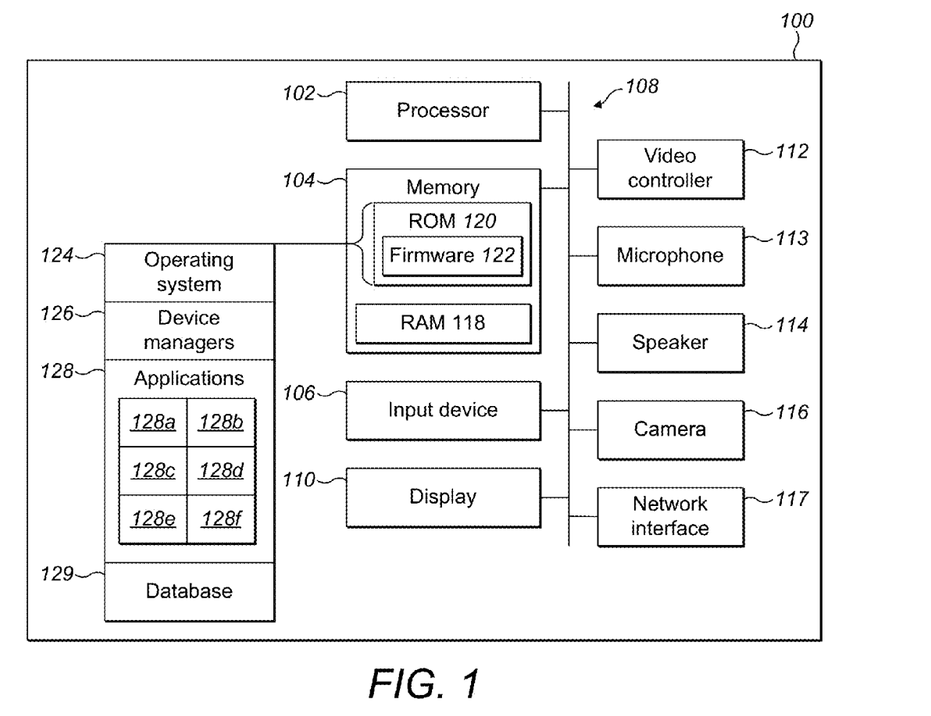
FIG. 1 is an internal schematic view of a videoconferencing device according to embodiments of the present invention.

FIG. 1 illustrates a videoconferencing device 100 according to embodiments of the present invention which may include at least the features of the UC360 device sold by Mitel Networks Corporation.

The videoconferencing device 100 comprises a processor 102, a memory 104, a display 110 and an input device 106. The input device 106 may be a dialling pad or alternatively the display 110 may be provided with touch-screen functionality for making selections, the display in this case acting as both an output device and the input device 106. A system bus 108 is used for sending signals between components of the videoconferencing device 100 such as control signals, video and audio data, and signals for processing the video and audio. Other components coupled to the system bus 108 comprise a video controller 112 that is controlled by the processor 102 to generate images for display on the display 110, one or more microphones 113, one or more speakers 114, one or more cameras 116 (although the camera may instead be separate to the video conferencing device 100 and accessed via a network interface) and a network interface 117 for sending/receiving signals over a network.

With reference to the memory 104, the videoconferencing device 100 typically includes both volatile memory, for example RAM 118, and non-volatile memory, for example ROM 120, Flash Memory, or the like. The non-volatile portion of the memory 104 can be used to store persistent information which should not be lost when the videoconferencing device 100 is powered down. Within the ROM 120, can be firmware 122. Within the memory 104, the videoconferencing device 100 can include an operating system (OS) 124 stored in the ROM 120, which can manage programs. The OS 124 can reside in the memory 104 and be executed on the processor 102. Suitable operating systems 124 will be familiar to a person skilled in the relevant art.

The memory 104 can also include one or more device managers 126 for interacting with one or more input and/or output devices (for example, the or each camera 116 and the display 110). The device managers 126 can be software installed on the videoconferencing device 100. A device manager 126 can correspond to each input and/or output device. In addition to the device managers 126, applications 128 can be loaded into memory 104 and run on or in association with the OS 124.

Applications 128 including Microsoft Office™ readers 128a, a web browser 128b, a videoconferencing session initiation application 128c, an initial bit rate estimation application 128d, a video conferencing application 128e including one or more appropriate codecs for enabling videoconferencing to take place, and a dynamic band width adaptation application 128f for instance can be provided within memory 104. Also, processing and memory required to support HD, for example 1080p×30 fps, point-to-point and bridged video conferencing and video playback capability may be provided.

It will be appreciated that the video conferencing device 100 can communicate with one or more other video conferencing devices via one or more networks (e.g. the internet, one or more LANs, WANs, MANs etc). In the illustrative example shown in FIG. 2, the video conferencing device 100 is capable of engaging in a videoconferencing session (otherwise referred to as a videoconference call) with a plurality of other video conferencing devices 100a to 100g via the internet 130 and LANs 132 and 133.

In order for the videoconferencing device 100 to start videoconferencing with another videoconferencing device (such as those denoted 100a to 100g in FIG. 2), the videoconferencing session initiation application 128c is loaded into memory 104 and run on or in association with the OS 124. A user of the videoconferencing device 100 then inputs information associated with a videoconferencing device 100a-100g they wish to connect with. In one example, a user may wish to connect with videoconferencing device 100b hereafter referred to as target endpoint 101. This may be achieved for example by entering a telephone number associated with target endpoint 101 or by making a selection from a directory system shown on the display 110. Details contained in such a directory system may be stored either locally in the memory 104 of the videoconferencing device 100 or remotely on a server, wherein they are merely accessible via the network interface 117.

Figure 3:
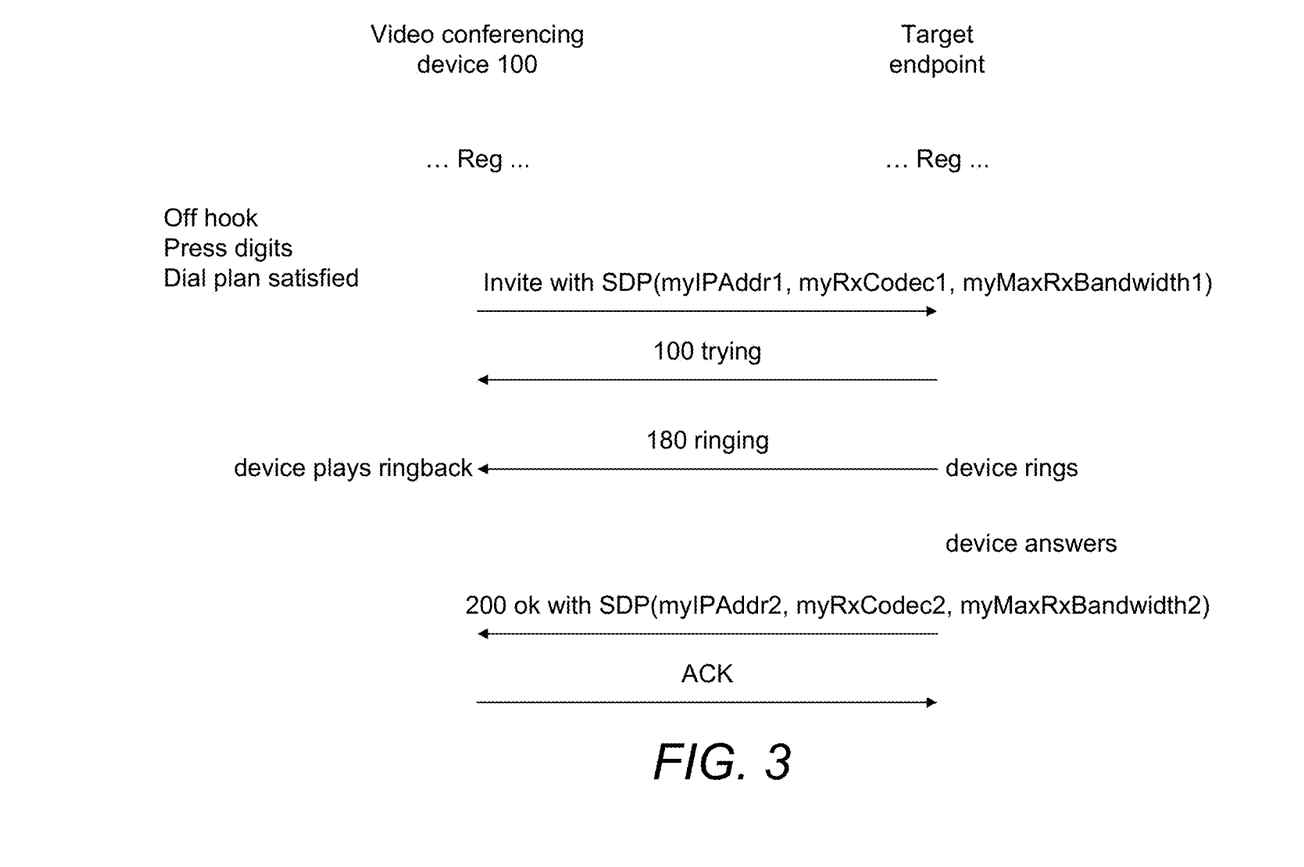
FIG. 3 is an example signalling diagram relating to a video conferencing session initiation protocol.

Once details of target endpoint 101 have been entered (or selected) the processor 102 implements functionality provided by the videoconferencing session initiation application 128c, in conjunction with the user inputted information, to initiate a videoconferencing session with target endpoint 101. This may involve the use of a video conferencing session initiation protocol. Signalling according to one such protocol is depicted in FIG. 3 and involves sending session description protocol (SDP) information to target endpoint 101. This information may be indicative of the IP address associated with the videoconferencing device 100, the or each receiving video/audio codec that the videoconferencing device 100 intends to use in the videoconferencing session, and the maximum receive bit rate of the videoconferencing device 100. The sending of the SDP information marks the beginning of a call set up process.

Next, target endpoint 101 sends a 100-trying signal and a 180-ringing signal back to the videoconferencing device 100 in response to receiving the SDP information. This causes target endpoint 101 to indicate the existence of an incoming videoconferencing call request and the videoconferencing device 100 to indicate that target endpoint 101 is doing so. The target endpoint 101 and/or the videoconferencing device 100 may achieve this by using their respective processors 102 to cause their respective speakers 114 to play a ringing sound. The videoconferencing call request may alternatively be announced in another way, e.g. through an audible and/or visual indication.

When the incoming videoconferencing call is answered by a user of target endpoint 101 a 200-OK signal is sent from target endpoint 101 to the videoconferencing device 100 in addition to SDP information relating to target endpoint 101. Such information may be indicative of the IP address associated with target endpoint 101, the or each receiving video/audio codec that target endpoint 101 intends to use in the video conferencing session, and the maximum receive bit rate of target endpoint 101. Upon receipt by the videoconferencing device 100 of both the 200-OK signal and the SDP information, the videoconferencing session is initiated by the videoconferencing device 100 sending an ACK message back to the target endpoint 101. Receipt of this ACK message by the target endpoint 101 marks the end of the call set up process.

Although details of one particular videoconferencing session initiation protocol have been outlined above, one or more other protocols may be used instead to initiate a videoconferencing session.

The initial bit rate estimation application 128d is next loaded into memory 104 and run on or in association with the OS 124. As will be described in more detail, by implementing functionality provided by the initial bit rate estimation application 128d, an estimate of the optimal video bit rate at which initially to transmit video to target endpoint 101 is determined.

The video conferencing application 128e is also loaded into memory 104 and run on or in association with the OS 124. Functionality provided by the video conferencing application 128e enables the implementation of video conferencing in the initiated videoconferencing session. When implementing this functionality, video is initially transmitted by the videoconferencing device 100 to target endpoint 101 at a bit rate equal to that determined using the initial bit rate estimation application 128d.

Throughout the videoconferencing session the dynamic bandwidth adaptation application 128f remains executed from the memory 104 in association with the OS 124. The dynamic bandwidth adaptation application 128f enables the bit rate at which data is transmitted by the videoconferencing device 100 to target endpoint 101 to be varied during progress of the videoconference call to maintain a suitably high utilisation of the available bandwidth, even as the available bandwidth fluctuates during the videoconferencing session. A dynamic bandwidth adaptation application in target endpoint 101 operates to adjust the bit rate at which data is transmitted to the videoconferencing device 100 during progress of the videoconference call to maintain a suitably high utilisation of the available bandwidth, even as the available bandwidth fluctuates during the video conferencing session. It will be understood that the bandwidth, in terms of maximum bit rate, may be different in the different directions of the channel. This is especially the case where one party uses an ADSL (asynchronous digital subscriber line) connection to the Internet.

Persons skilled in the art will be familiar with details of suitable video conferencing applications 128e and dynamic bandwidth adaptation applications 128f. However, implementation details of functionality provided by the initial bit rate estimation application 128d will now be described in more detail.

Initial Bit Rate Estimation Application

Figure 4:
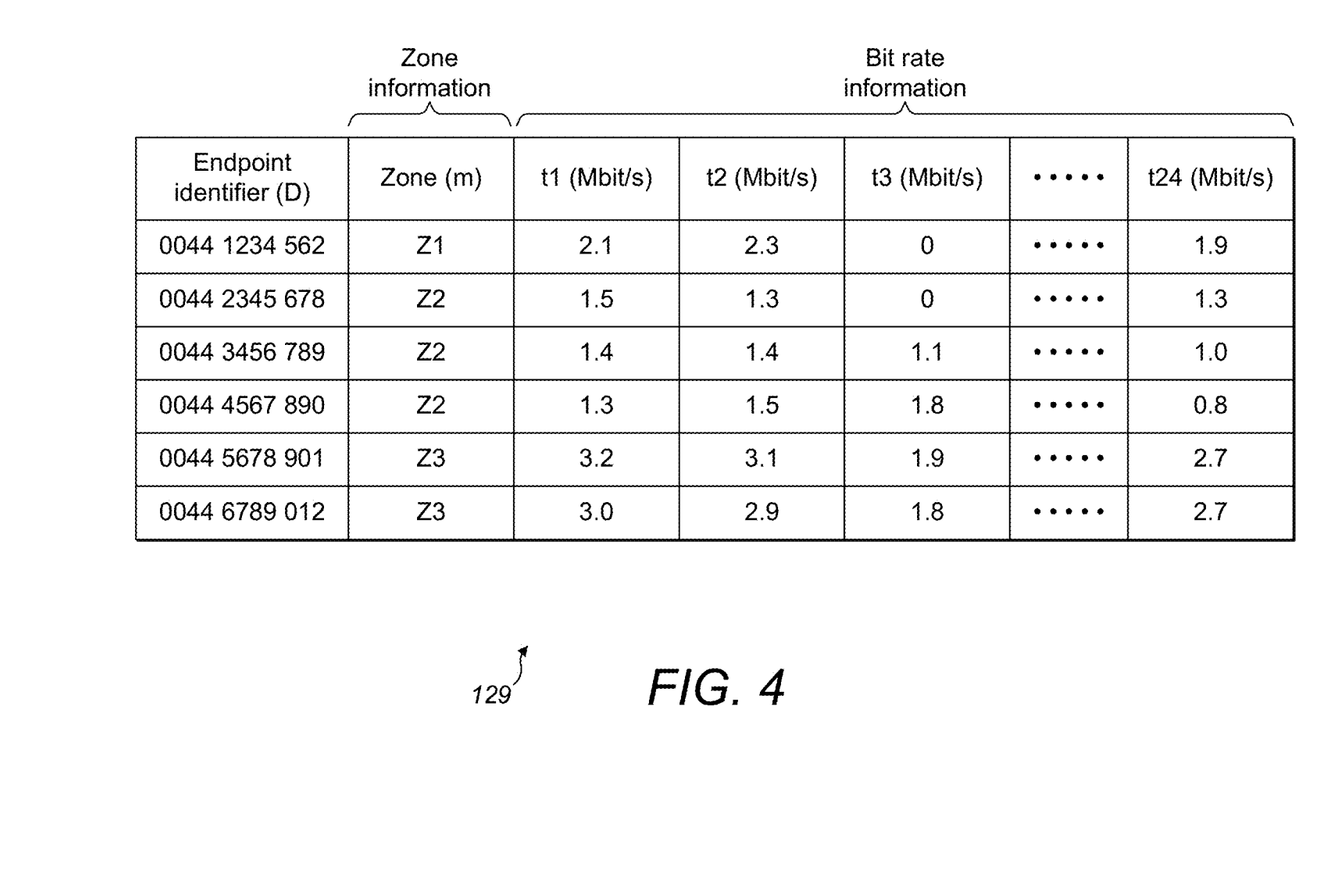
FIG. 4 is a diagrammatic representation of contents of a use history database used by an initial bit rate estimation application forming part of the videoconferencing device.

The initial bit rate estimation application 128d makes use of a database to which the videoconferencing device 100 has access. The database, hereafter the history database 129, is stored in the memory 104 of the videoconferencing device 100. FIG. 4 illustrates an example of contents of the history database 129 in table form.

The history database 129 comprises one or more records, each record including information indicative of an identifier of an endpoint with which the videoconferencing device 100 has previously participated in one or more videoconferencing sessions. Such an identifier is hereafter referred to as an endpoint identifier. Each endpoint is associated with a respective endpoint identifier that is unique to that particular endpoint (e.g. a telephone number, URL or a static IP address).

Each record in the history database 129 also includes zone information, indicative of a zone (e.g. logical area) in which the endpoint associated with that record is located.

Furthermore, each record in the history database 129 includes bit rate information. Such bit rate information comprises a weighted average of the average video bit rate at which video was transmitted to the endpoint associated with that record, by the videoconferencing device 100, during all previous videoconferencing sessions therewith. In some embodiments, the bit rate information may be divided into time slots. In other words, for each record, bit rate information is associated with each respective time slot. More specifically, such bit rate information comprises a weighted average of the average video bit rate at which video was transmitted to the endpoint associated with that record, by the videoconferencing device 100, during all previous videoconferencing sessions therewith, which occurred during the respective time slot.

In the example depicted in FIG. 4, each record (i.e. each row) is associated with a videoconferencing device with which the video conferencing device 100 has previously participated in one or more videoconferencing sessions. In each respective record, the information indicative of the videoconferencing device associated with that record (i.e. the endpoint identifier) comprises a telephone number uniquely associated with that particular videoconferencing device. The zone information in each respective record (e.g. Z1, Z2, Z3) indicates the zone in which the videoconferencing device associated with that record is located. As will be explained in further detail below, the bit rate information in each record is associated with the bit rate at which the video conferencing device 100 transmitted video, to the videoconferencing device associated with that record, during previous videoconferencing sessions therewith.

Zone Information

Figure 6:
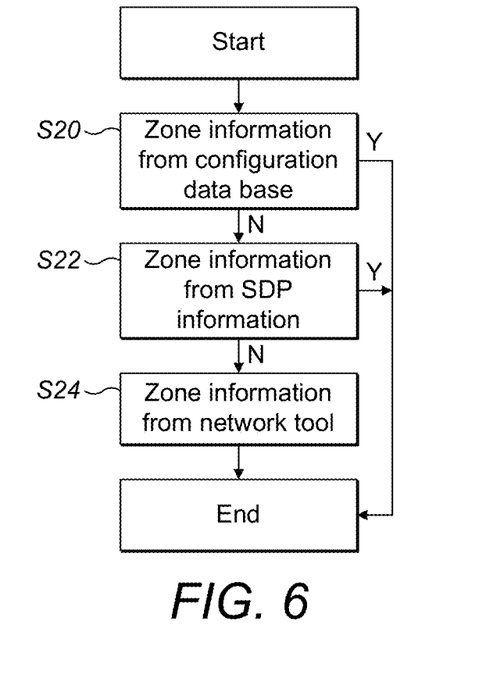
FIG. 6 is a flow diagram depicting functionality of a zone acquisition procedure performed by the videoconferencing device.

The zone information of a particular endpoint may be determined using a zone acquisition procedure. FIG. 6 shows one example of a suitable zone acquisition procedure and is explained in detail later on. In essence, to determine the zone of a target endpoint, the processor 102, operating in accordance with instructions defined by the initial bit rate estimation application 128d, implements one or more techniques for determining the zone of the target endpoint. In some embodiments in which the initial bit rate estimation application 128d is capable of causing the processor 102 to implement a series of such techniques, the processor 102 successively implements such techniques if the initial or the preceding technique in the series did not yield zone information of the target endpoint.

One example of a technique for determining the zone information of a target endpoint involves analysing the IP address used by that endpoint. More specifically, the IP address of a target endpoint may be used to determine the subnet of that endpoint and thus the zone in which that endpoint is located. To illustrate this, respective IP addresses used by the videoconferencing devices 100a to 100g in FIG. 2 (such IP addresses being either static or dynamic) may, at a point in time, be as follows.

Figure 2:
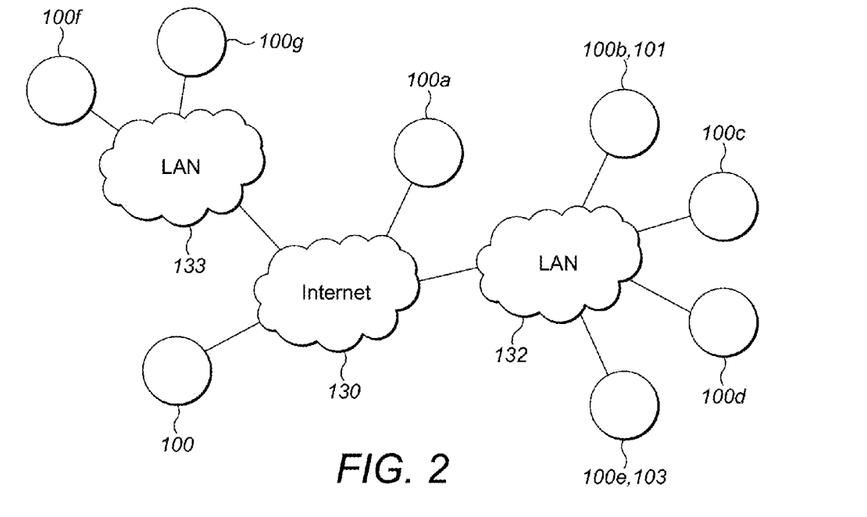
FIG. 2 is a schematic view of a system incorporating the videoconferencing device of FIG. 1 and illustrating how it may be coupled to one or more other videoconferencing devices.

| Video Conferencing Device | IP Address |
|---|---|
| 100a | 10.168.3.230 |
| 100b | 192.168.8.230 |
| 100c | 192.168.8.231 |
| 100d | 192.168.8.232 |
| 100e | 192.168.8.233 |
| 100f | 10.170.5.231 |
| 100g | 10.170.5.233 |

Since videoconferencing devices 100b to 100e connect to the internet 130 via a LAN 132 (see FIG. 2), analysis of their respective IP addresses and gateways will reveal that they are each located in the same portion of the network in FIG. 2 and are thus in the same zone. The initial bit rate estimation application 128d, particularly the zone acquisition procedure functionality thereof, may use this information to classify all videoconferencing devices which connect to the internet 130 via LAN 132 as being in the same zone. The same also applies to the videoconferencing devices 100f and 100g in that, since they connect to the internet 130 via LAN 133, analysis of their respective IP addresses and gateways will reveal that they are each located in the same portion of the network in FIG. 2 and are thus in the same zone. The initial bit rate estimation application 128d, particularly the zone acquisition procedure functionality thereof, may use this information to classify all videoconferencing devices which connect to the internet 130 via LAN 133 as being in the same zone. The videoconferencing device low is not connected to either of the LANs 132, 133. As a result, analysis of the IP address used by videoconferencing device 100a will reveal that it is located in yet another portion of the network in FIG. 2, and is thus in yet another zone. The initial bit rate estimation application 128d, particularly the zone acquisition procedure functionality thereof, may use this information to classify the videoconferencing device 100a as being in yet another zone.

Following on from the above example, the zone information in the respective records in the history database 129 (see FIG. 4) is indicative that videoconferencing device 100a is in zone Z1, that videoconferencing devices 100b to 100d are in zone Z2 and that videoconferencing devices 100f and 100g are in zone Z3. Information relevant to videoconferencing device 100e is not present in the history database 129 because in the present example the videoconferencing device 100 has not yet participated in a videoconferencing session with videoconferencing device 100e in FIG. 2. It will therefore be appreciated that the rows in FIG. 4 in descending order are associated with videoconferencing devices 100a to 100d, 100f and 100g in FIG. 2. For completeness, if the videoconferencing device 100 were to participate in a videoconferencing session with videoconferencing device 100e, like with any other endpoint which couples to the internet via LAN 132, upon implementing zone acquisition procedure functionality the videoconferencing device 100 would determine the videoconferencing device 100e to be in zone Z2.

Skilled persons will appreciate that other techniques may be used to determine the zone information of endpoints. Such techniques might involve extracting zone information from SDP information received during call setup for instance, or alternatively might involve the use of a network tool (e.g. PING or traceroute). Such techniques will be described in more detail later on with reference to FIG. 6.

Bit Rate Information

The bit rate information in FIG. 4 will now be explained in more detail. In this particular example the bit rate information has been divided into respective time slots which here represent one hour intervals divided over a twenty four hour period. The time slots t1, t2, t3 . . . t24 in FIG. 4 thus each represent an hour of time. In particular, time slot t1 may be associated with previous videoconference sessions occurring between the hours 12.00 pm and 1.00 pm. Time slot t2 may be associated with previous videoconference sessions occurring between the hours 1.00 pm and 2.00 pm, and time slot t3 may be associated with previous videoconference sessions occurring between the hours 2.00 pm and 3.00 pm. Finally, time slot t24 may be associated with previous videoconference sessions occurring between the hours 11.00 am and 12.00 pm. Note that in this example all times are that in the locality where the videoconferencing device 100 is located. However the time slots may instead represent times in the locality where the target endpoint(s) is(are) located or a global time, such as UTC (coordinated universal time).

With reference to FIG. 4, the value associated with each respective time slot in the first row of the table comprises a weighted average of the average video bit rate at which video was transmitted, by the videoconferencing device 100, to the video conferencing device 100a, during all previous videoconferencing sessions therewith, which occurred during the time associated with the respective time slot. If no videoconferencing sessions with a particular endpoint have previously taken place within a specific time slot then the weighted average of the bit rate recorded in that particular time slot, for that particular endpoint, is zero. This may be represented by a value of zero, as shown in FIG. 4, or it may be represented by an empty field.

Considering again the first row of the table in FIG. 4, the value recorded in the table in the time slot t1 is 2.1. In this example this means that 2.1 Mbit/s is the weighted average value of the average bit rate, at which the videoconferencing device 100 transmitted video, to the video conferencing device 100a, during all previous videoconferencing sessions therewith, that occurred between the hours of 12.00 pm and 1.00 pm. Similarly, 2.3 is recorded in the table in the time slot t2. In this example this means that 2.3 Mbit/s is the weighted average value of the average bit rate, at which the videoconferencing device 100 transmitted video, to the video conferencing device 100a, during all previous videoconferencing sessions therewith, that occurred between the hours of 1.00 pm and 2.00 pm. The value recorded in the table in the time slot t3 is 0. This means that the videoconferencing device 100 has not previously participated in a videoconferencing session with the videoconferencing device 100a between the hours of 2.00 pm and 3.00 pm.

With further reference to FIG. 4, as already mentioned, in this example the second to fourth rows in the table are associated with the videoconferencing devices 100b to 100d in FIG. 2. Also, the fifth and sixth rows in the table are associated with the videoconferencing devices 100f and 100g in FIG. 2.

It will be appreciated that the history database 129 is populated more the more that the videoconferencing device 100 is used. In other words, the more target endpoints with which the videoconferencing device 100 participates in videoconferencing sessions, the more records there will be stored in the use history database 129.

Implementation, First Example

How the initial bit rate estimation application 128d uses the history database 129 will now be explained with reference to FIG. 5. We refer back to the example in which a user wishes to participate in a videoconference session with target endpoint 101 (see FIG. 2). After the call set up process implemented by the videoconferencing session initiation application 128c has ended, in step S1, the initial bit rate estimation application 128d causes the processor 102 to determine the endpoint identifier uniquely associated with the target endpoint 101. In this particular example, this involves determining the telephone number used to make contact with target endpoint 101. This may be implemented using the telephone number dialled or selected by a user when initiating a videoconferencing call with the target endpoint 101.

In step S2 the processor 102, operating as instructed by the initial bit rate estimation application 128d, consults the history database 129 to determine whether a record associated with the endpoint identifier, unique to the target endpoint 101, already exists. In this particular example the processor 102 achieves this by comparing the telephone number of target endpoint 101 (00442345678) with the telephone numbers stored in the history database 129. If such a record is found to exist, which will occur in this example (see the second row in FIG. 4), the processor 102 moves onto step S3. It will be appreciated that the information contained in the second row in FIG. 4 was generated following all previous videoconference calls to the target endpoint 101.

Step S3 involves determining the current time and the time slot in which the current time falls. In step S 4 the processor 102 then uses the history database 129 to determine, from the record associated with the target endpoint 101, the weighted average bit rate value recorded in the time slot associated with the current time. This value is the first of two values comprising part of the initial bit rate calculation. To determine the second value, the processor moves onto step S5.

In step S5 the processor 102 identifies whether any other records exist in the history database 129 for endpoints in the same zone as the target endpoint 101. If not, then a zero value is returned as the second value in step S6. However, if other records are found to exist, the processor 102, in step S7, determines which records in the history database 129 are associated with endpoints in the same zone as target endpoint 101. The processor 102 then determines the second value to be an average of the bit rate values recorded in each such record under the current time slot. The processor 102 then, in step S8, determines a value for the initial bit rate at which to transmit video during the videoconferencing session with target endpoint 101. This is determined by calculating a weighted average of the first and second values. This initial bit rate value is an estimate of the optimal video bit rate. If for any reason either the first or the second values are zero, they are not included in the average.

The video conferencing application 128e then, in step S9, causes the processor 102, when implementing the functionality provided thereby, to initially transmit video to the target endpoint 101 at the estimated optimal bit rate value.

Consider the scenario in which videoconferencing device 100 stores the database shown in FIG. 4 and in which a user of the videoconferencing device 100 wishes to initiate a videoconferencing session with videoconferencing device 100c at 1.15 pm (which falls in time slot t2). In this case, step S1 will involve the processor 102 determining the telephone number of the videoconferencing device 100c (the target endpoint) to be 00443456789. Step S2 will involve the processor 102 consulting the history database 129 (FIG. 4) to determine whether a record associated that telephone number already exists. In this case a positive determination will be made since the third row in the database corresponds to the telephone number 00443456789. Step S3 will then involve the processor 102 determining the current time to be 1.15 pm and the associated time slot to be t2. Step S4 will involve the processor 102 determining from the third row in the history database 129, the weighted average bit rate value recorded in time slot t2. In this case the value is 1.4 Mbit/s. This value is the first of two values comprising part of the initial bit rate calculation. To determine the second value, the processor 102 determines, in step S5, whether any records exist in the history database 129 for endpoints in the same zone as the videoconferencing device 100c, namely zone Z2. In this case a positive determination will be made since the second and fourth rows in the zone database 129 are associated with calls to videoconferencing devices in the zone Z2. The processor 102 will then, in step S7, identify the records in the history database 129 associated with telephone numbers 00442345678 and 00444567890 (those associated with videoconferencing devices 100b and 100d). The processor 102 then determines the second value to be an average of the bit rate values recorded in each such record under time slot t2. In this case, the processor 102 will determine the second value to be an average of 1.3 and 1.5 Mbit/s. Finally, the processor 102, in step S8, determines a value for the initial bit rate at which to transmit video during the videoconferencing session with videoconferencing device 100c. This is determined by calculating a weighted average of the first and second values, namely a weighted average of both 1.4 Mbit/s and the average of 1.3 & 1.5 Mbit/s. The videoconferencing device 100 then, in step S9, begins transmitting video to the videoconferencing device 100c at the bit rate calculated in the preceding step.

The initial bit rate calculation may be represented mathematically as:

$$BR_n(m, D, t) = a_0^* BR_{n-1}(m, D, t) + \frac{1}{I} * \left( \sum_{i=1, i \neq D}^{I} a_i^* BR_{n-1}(m, i, t) \right)$$

-continued where $$\sum_{i=0}^{I} a_i = 1$$

In the above equation m=zone information, D=endpoint identifier, t=time slot, BR=the weighted average bit rate value recorded in the history database 129 in a particular time slot for a particular endpoint identifier, I=the number of endpoints in the same zone as D; the values of these parameters may be determined from the use history database 129 (see FIG. 4)

Implementation, Second Example

Figure 5:
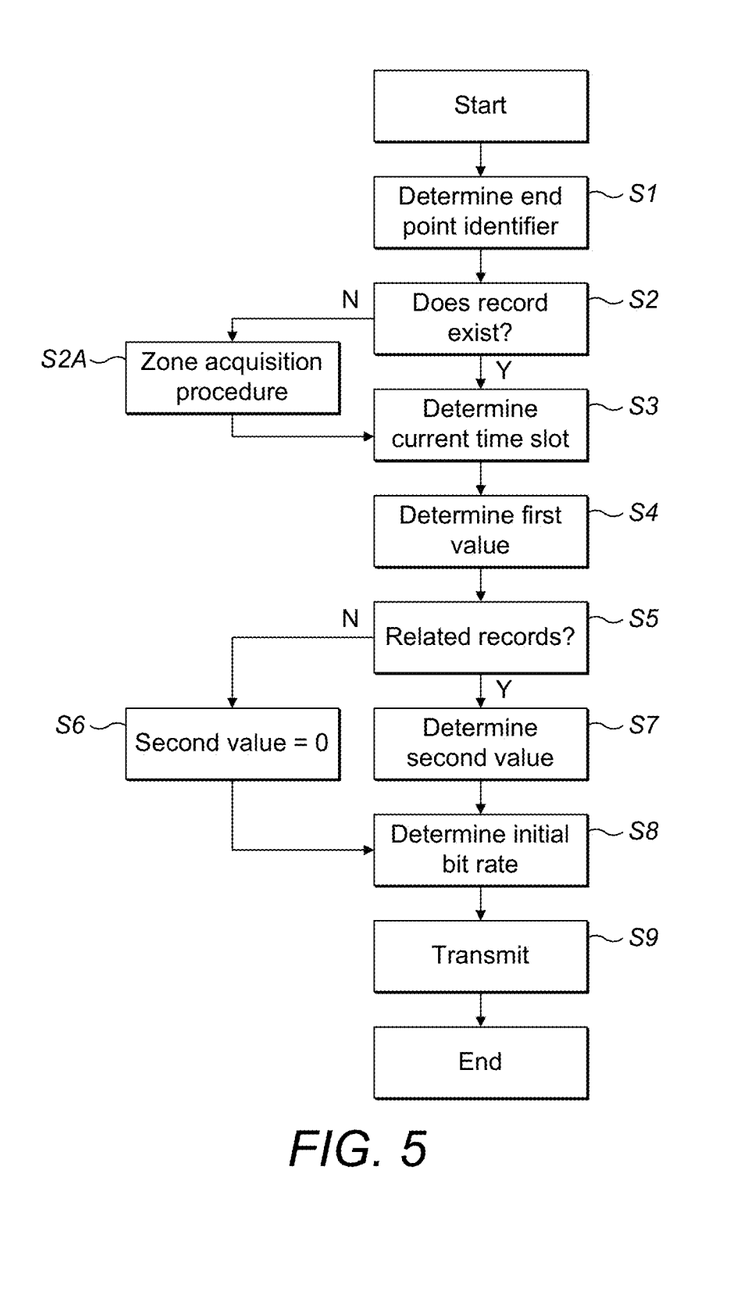
FIG. 5 is a flow diagram depicting how functionality of the initial bit rate estimation application is implemented.

With further reference to FIG. 5, when carrying out step S2 the processor 102 may determine that no record associated with the endpoint identifier of the target endpoint (in this example, the telephone number thereof) already exists. This may occur for instance if the target endpoint is videoconferencing device 100e, hereafter referred to as target endpoint 103, which is associated with the telephone number 00447568123 (see FIG. 2). In the present example, looking at FIG. 4 it will be apparent that no record is present in the history database 129 for an endpoint associated with the telephone number 00447568123. In other words, in this example the videoconferencing device 100 has not previously participated in a videoconference call with the videoconferencing device 100e. The processor 102 therefore implements a zone acquisition procedure in step S2A to determine the zone information associated with the target endpoint 103.

As previously mentioned, implementing a zone acquisition procedure may involve the processor 102 using one or more techniques to determine the zone of the target endpoint 103. The processor 102 may be capable of performing a series of such techniques, wherein successive techniques are only used if the initial or the previous technique in the series did not yield zone information of the target endpoint 103.

Some particular examples of ways in which the processor 102 may determine zone information of the target endpoint 103 will now be described. For instance determining the zone information of the target endpoint 103 may involve the processor 102 consulting information stored in a configuration database in which a user has associated the endpoint identifier of one or more endpoints with a particular zone. Alternatively the processor may determine such zone information using information sent from the target endpoint 103 (for example the SDP information received during session initiation). Furthermore, the processor 102 may deduce zone information of the target endpoint 103 using a network tool such as SNMP, PING or traceroute.

FIG. 6 illustrates the functionality of a suitable zone acquisition procedure, the functionality of which will now be explained. Upon making a negative determination in step S2 the processor 102 may first consult a configuration database in step S20 to determine whether zone information of the target endpoint 103 can be determined from the configuration database; this is achieved by determining whether the endpoint identifier associated with the target endpoint 103 (in this example, the telephone number thereof) has been pre-assigned to a particular zone. If yes, the processor 102 proceeds to step S3 already described. If no (or if such a configuration database is not accessible) the processor 102 implements step 22. Here the processor 102 determines whether zone information of the target endpoint 103 can be determined from the SDP information received during session initiation. If yes, the processor 102 proceeds to step S3 already described. If no the processor 102 implements step S24. In step S24 the processor 102 implements functionality of a network tool (for example SNMP, PING or traceroute) to determine zone information of the target endpoint 103. Once such zone information has been determined the processor 102 proceeds to step S3 already described.

Referring back to FIG. 5, once the processor 102 has determined zone information of the target endpoint 103 the current time is determined in step S3 as well as the associated time slot. In step S4, unlike the contrasting case when a positive result is returned in step S2, since the videoconferencing device 100 has not previously participated in a videoconferencing session with an endpoint associated with the endpoint identifier of the target endpoint 103, the heretofore mentioned first value comprising part of the initial bit rate calculation is determined to be zero in step S4. However, in a similar manner to that previously described, since the zone information associated with the target endpoint 103 is known, the processor 102 determines in step S5 whether any records exist in the history database 129 for endpoints in the same zone as the target endpoint 103. If not, then a zero value is returned as the second value in step S6. However, if yes, then the processor in step S7 determines which records in the history database 129 are associated with endpoints determined to be in the same zone as the target endpoint 103. The processor 102 then determines the second value to be an average of the bit rate values recorded in each such record under the current time slot. The processor 102 then determines, in step S8, a value for the initial bit rate at which to transmit video during the videoconferencing session with the target endpoint 103. In the previous example this was determined by calculating a weighted average of the first and second values. However since the first value in this example was determined to be zero in step S4, provided that the second value is not also zero, the initial bit rate is determined as being the second value in step S8. This initial bit rate value is an estimate of the optimal video bit rate. In step S9 the video conferencing application 128e then causes the processor 102, when implementing the functionality provided thereby, to initially transmit video to the target endpoint 103 at the bit rate value determined in step S8.

If for whatever reason the initial bit rate value is calculated to be zero, then a predetermined value is used as the initial bit rate. This pre-determined value (for instance 1.5 Mbit/s) may be defined in the software comprising the initial bit rate estimation application 128d. Alternatively such a pre-determined value may be determined by the processor 102, while implementing the initial bit rate estimation application 128d, by determining this value from a database.

Consider the scenario in which videoconferencing device 100 stores the database shown in FIG. 4 and in which a user of the videoconferencing device 100 wishes to initiate a videoconferencing session with videoconferencing device 100e at 1.15 pm (which falls in time slot t2). In this case, step S1 will involve the processor 102 determining the telephone number of the videoconferencing device 100e (the target endpoint) to be 00447568123. Step S2 will involve the processor 102 consulting the use history database 129 (FIG. 4) to determine whether a record associated with that telephone number already exists. In this case a negative determination will be made since no row in the database corresponds to the telephone number 00447568123. The processor 102 will thus implement a zone acquisition procedure in step S2A. The processor 102 might, for instance, implement the zone acquisition procedure shown in FIG. 6.

If this is the case then, for example, the processor 102 might, in step S22, determine the zone information of the videoconferencing device me from the SDP information sent during the videoconference session initiation process. Referring back to FIG. 5, step S3 will then involve the processor 102 determining the current time to be 1.15 pm and the current timeslot to be t2. As aforementioned, in this case when the processor implements step S4, the first value, comprising part of the initial bit rate calculation, will be determined to be zero. Next, in step S5, the processor 102 will determine whether any records exist in the history database 129 for endpoints in the same zone as the videoconferencing device woe, namely the zone Z2. In this case a positive determination will be made since the second, third and fourth rows in the history database 129 are associated with calls to the videoconferencing devices which are in zone Z2 (video conferencing devices 100b to 100e are coupled to the internet 130 via the same LAN 132, see FIG. 2). The processor 102 will then, in step S7, determine which records in the history database 129 are associated with the videoconferencing devices in the zone Z2. The processor 102 will then determine the second value in step S7 by calculating an average of 1.3, 1.4 and 1.5 Mbit/s. Finally, in step S8, the processor 102 determines a value for the initial bit rate at which to transmit video during the videoconferencing session with videoconferencing device 100e. Ordinarily this is determined by calculating a weighted average of the first and second values. However since in this example the first value was determined in step S4 to be zero, the initial bit rate is determined in step S8 as being the second value, namely the average of 1.3, 1.4 & 1.5 Mbit/s. The videoconferencing device 100 will then, in step S9, begin transmitting video to the videoconferencing device 100e at the bit rate determined in the preceding step.

Throughout a videoconferencing session the video bit rate at which the videoconferencing device 100 transmits video to the target endpoint may be adjusted by the processor 102 implementing functionality provided by the dynamic bandwidth adaptation application 128f. As already mentioned, this enables the bit rate at which video is transmitted by the videoconferencing device 100 to a target endpoint to be varied to maintain a suitably high utilisation of the available bandwidth, even as the available bandwidth fluctuates.

History Database Update

When a videoconferencing session with a target endpoint ends, the history database 129 is updated to take into account the average bit rate at which video was transmitted by the videoconferencing device 100 during the videoconferencing session. If no records in the history database include information concerning the endpoint identifier of a target endpoint (in the foregoing example the endpoint identifier is defined by a telephone number) this may involve creating a new record and recording, in each respective time slot, details of the average bit rate at which video was transmitted during the associated time slot, by the videoconferencing device 100, throughout the videoconferencing session. Furthermore, zone information of the target endpoint is stored. Alternatively however, if a record is determined to include information concerning the endpoint identifier of the target endpoint, updating the history database 129 may involve updating the weighted average bit rate value for each respective time slot, to take into account the average bit rate at which video was transmitted, during the associated time slot, by the videoconferencing device 100, throughout the videoconferencing session. An algorithm for implementing this is represented mathematically as follows:

$$BR_n(m, i, t) = \alpha * BR_{n-1}(m, i, t) + \beta * \overline{BR_n}(m, i, t)$$

where $\alpha + \beta = 1$

In the above equation m=zone information, i=endpoint identifier, t=time slot, BR=the weighted average bit rate value recorded in the history database 129 in a particular time slot for a particular endpoint identifier; the values of these parameters may be determined from the history database 129; $\overline{BR}$ is the average transmitted bit rate during the call.

Other Embodiments

Although telephone numbers uniquely assigned to the respective videoconferencing devices heretofore mentioned have been used as endpoint identifiers, this is not intended to be limiting. Any property uniquely associated with respective endpoints may be utilised in the context of an endpoint identifier. For instance, IP address uniquely assigned to respective endpoints may be used as endpoint identifiers instead of telephone numbers. Also, URLs uniquely associated with respective endpoints may be used as endpoint identifiers.

Throughout this description the history database 129 has been described as comprising records which include bit rate information. In particular, the history database 129 has been described in the sense that weighted average values of bit rate are calculated and it is such weighted average values that are stored in the database 129. However, in some embodiments the history database 131 may not be used to store such determined weighted average values. Instead the history database 129 may include a collection of raw data records generated by the videoconferencing device 100 following previous videoconferencing sessions. In such embodiments whenever a weighted average value is required by the processor 102, for determining the initial video bit rate at which to transmit video during a particular video conferencing session, the processor 102 must first determine such weighted average value from the collection of raw data records.

The videoconferencing device 100 may be configured to share data generated thereby with other videoconferencing devices. For example, videoconferencing devices in a particular zone may each have access to their own history database 129 but are capable of sharing database information with one another by transmitting (for example by broadcasting) such information among one another at predetermined times or whenever a respective database has been updated. This enables the collection of information stored in the respective history databases 129 of videoconferencing devices to be populated faster over time, thereby increasing the speed with which estimates of the optimal video bit rate at which to transmit video to a target endpoint can be determined. Having a larger collection of data also improves the accuracy of estimates of the optimal video bit rate.

In embodiments in which the videoconferencing device 100 uses the session initiation protocol, described in connection with FIG. 3, the processor 102 may be configured to implement an additional step when determining the initial bit rate at which to transmit video during a videoconferencing session with a target endpoint. In particular, the calculated value of the initial video bit rate (determined in step S8, see FIG. 5) may be compared with the maximum receive bit rate in the SDP information received from the target endpoint during call setup. If the calculated value of the initial video bit rate is less than the maximum receive bit rate, the videoconferencing device 100 may initially transmit video to the target endpoint at a bit rate which is part-way between (for example one half or one third between) the maximum receive bit rate and the calculated value of the initial video bit rate. Alternatively, if the calculated value of the initial video bit rate is greater than the maximum receive bit rate, the videoconferencing device 100 may initially transmit video to the target endpoint at a bit rate which is less than the maximum receive bit rate.

Records in the history database 129 may comprise any number of time slots, and such time slots may represent any duration of time. For instance, the time slots may each represent three hours of time divided over a twenty four hour period or a twelve hour period. Also, each time slot may represent one or more days divided over a week or a month for instance.

In some embodiments there may be a mix of manual assignment of endpoints to zones, and an assignment of zones to endpoints, via network tools. Thus, in such embodiments, particular endpoints may be manually assigned to particular zones. For instance a user may specify that one or more endpoints, associated with respective endpoint identifiers (e.g. respective telephone numbers), are located in a specific zone. More specifically, a user may specify that video conferencing devices associated with telephone numbers 00442345678 and 00443456789 are in zone A. Such a user may additionally specify that video conferencing devices associated with telephone numbers 00445678901 and 00446789012 are in zone B. In the example set out in this specification, doing so will provide that videoconferencing devices 100b and 100c in FIG. 2 are in zone A and that videoconferencing devices 100f and 100g are in zone B. Using this method, a user may also specify videoconference devices coupled to the same LAN as being in different zones. For instance, in the example set out in this specification, a user may additionally specify that the video conferencing device associated with telephone number 00443456789 (denoted 100c in FIG. 2) is in zone B. A configuration database containing a record of the particular specifications set by a user may be stored in the memory 104. In such embodiments, during use of the videoconferencing device 100 the initial bit rate estimation application 128d uses the configuration database to determine the zone in which particular endpoints are located.

In some embodiments the geographical location (for example city, region or country, longitude and/or latitude) at which an endpoint is located may be indicative of the zone information associated with that endpoint. Also, the timezone in which an endpoint is located may be indicative of the zone information associated with that endpoint.

It will be appreciated that whilst various aspects and embodiments have heretofore been described, the spirit and scope of the present invention is not limited to the particular embodiments set out herein and instead extends to encompass all embodiments, and modifications and alterations thereto, which fall within the scope of the appended claims.

The invention claimed is:

1. A method performed by a videoconferencing device, the method comprising:
   maintaining a database comprising multiple records, each record including bit rate information and relating to a particular endpoint identifier;
   initiating a videoconference call with a target endpoint;
   identifying one or more records in the database that relate to the endpoint identifier of the target endpoint;
   identifying one or more records in the database that relate to the endpoint identifier of one or more endpoints located in a common zone with the target endpoint;
   using bit rate information from the identified records to calculate an initial video bit rate for the videoconference call;
   determining as a first value, from each record relating to the endpoint identifier of the target endpoint, a weighted average of the average video bit rate, at which video was transmitted to the target endpoint, during previous videoconferencing sessions therewith; and
   initially transmitting video to the target endpoint at the calculated initial video bit rate.

2. The method of claim 1, further comprising determining, from each record relating to the endpoint identifier of an endpoint located in a common zone with the target endpoint, a weighted average value of:
   the average video bit rate at which video was transmitted to said respective endpoint during previous videoconferencing sessions therewith.

3. The method of claim 2, further comprising determining as a second value, an average of:
   the weighted average values, respectively associated with each said endpoint located in a common zone with the target endpoint.

4. The method of claim 3, wherein the step of calculating an initial video bit rate for the videoconference call comprises determining a weighted average of the first and second values.

5. The method of claim 1, wherein each record relates to a particular combination of a time slot and an endpoint identifier, and wherein identifying one or more records in the database comprises identifying one or more records that relate both to the appropriate endpoint identifier and to a time slot including a current time.

6. The method of claim 1, further comprising, after the videoconference call with the target endpoint has ended, updating the database to include bit rate information associated with the videoconference call.

7. The method of claim 6, further comprising determining a weighted average of:
   the average video bit rate at which video was transmitted to the target endpoint during the videoconference call; and
   a weighted average of the average video bit rate at which video was transmitted to the target endpoint during previous videoconferencing sessions therewith, prior to the videoconference call.

8. The method of claim 1, further comprising, after the videoconference call with the target endpoint has ended, sharing with at least one other videoconferencing device, for instance by broadcasting, information concerning the average video bit rate at which video was transmitted, to the target endpoint, during the videoconference call.

9. Apparatus comprising a videoconferencing device configured to:
   maintain a database comprising multiple records, each record including bit rate information and relating to a particular endpoint identifier;
   initiate a videoconference call with a target endpoint;
   identify one or more records in the database that relate to the endpoint identifier of the target endpoint;
   identify one or more records in the database that relate to the endpoint identifier of one or more endpoints located in a common zone with the target endpoint;
   use bit rate information from the identified records to calculate an initial video bit rate for the videoconference call;
   configured to determine as a first value, from each record relating to the endpoint identifier of the target endpoint, a weighted average of the average video bit rate, at which video was transmitted to the target endpoint, during previous videoconferencing sessions therewith; and initially transmit video to the target endpoint at the calculated initial video bit rate.

10. The apparatus of claim 9, configured to determine, from each record relating to the endpoint identifier of an endpoint located in a common zone with the target endpoint, a weighted average value of:

the average video bit rate at which video was transmitted to said respective endpoint during previous videoconferencing sessions therewith.

11. The apparatus of claim 10, configured to determine as a second value, an average of:

the weighted average values, respectively associated with each said endpoint located in a common zone with the target endpoint.

12. The apparatus of claim 11, wherein the apparatus is configured to calculate an initial video bit rate for the videoconference call by determining a weighted average of the first and second values.

13. The apparatus of claim 9, wherein each record relates to a particular combination of a time slot and an endpoint identifier, and wherein the apparatus is configured to identify one or more records in the database by identifying one or more records that relate both to the appropriate endpoint identifier and to a time slot including a current time.

14. A method performed by a videoconferencing device, the method comprising:

maintaining a database comprising multiple records, each record including bit rate information and relating to a particular endpoint identifier;

initiating a videoconference call with a target endpoint;

identifying one or more records in the database that relate to the endpoint identifier of the target endpoint;

identifying one or more records in the database that relate to the endpoint identifier of one or more endpoints located in a common zone with the target endpoint;

using bit rate information from the identified records to calculate an initial video bit rate for the videoconference call;

initially transmitting video to the target endpoint at the calculated initial video bit rate; and after the videoconference call with the target endpoint has ended, updating the database to include bit rate information associated with the videoconference call.

15. The method of claim 14, further comprising determining as a first value, from each record relating to the endpoint identifier of the target endpoint, a weighted average of the average video bit rate, at which video was transmitted to the target endpoint, during previous videoconferencing sessions therewith.

16. The method of claim 15, further comprising determining, from each record relating to the endpoint identifier of an endpoint located in a common zone with the target endpoint, a weighted average value of:

the average video bit rate at which video was transmitted to said respective endpoint during previous videoconferencing sessions therewith.

17. The method of claim 16, further comprising determining as a second value, an average of:

the weighted average values, respectively associated with each said endpoint located in a common zone with the target endpoint.

18. The method of claim 17, wherein the step of calculating an initial video bit rate for the videoconference call comprises determining a weighted average of the first and second values.

19. The method of claim 14, wherein each record relates to a particular combination of a time slot and an endpoint identifier, and wherein identifying one or more records in the database comprises identifying one or more records that relate both to the appropriate endpoint identifier and to a time slot including a current time.

20. The method of claim 14, further comprising determining a weighted average of:

the average video bit rate at which video was transmitted to the target endpoint during the videoconference call; and a weighted average of the average video bit rate at which video was transmitted to the target endpoint during previous videoconferencing sessions therewith, prior to the videoconference call.

* * * * *